US007908921B2

(12) United States Patent
Binda et al.

(10) Patent No.: US 7,908,921 B2
(45) Date of Patent: Mar. 22, 2011

(54) BAROMETRIC-PRESSURE-SENSOR DEVICE WITH ALTIMETER FUNCTION AND ALTIMETER-SETTING FUNCTION

(75) Inventors: Ivo Binda, Voghera (IT); Michele Tronconi, San Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 79 days.

(21) Appl. No.: 12/357,629

(22) Filed: Jan. 22, 2009

(65) Prior Publication Data
US 2009/0217754 A1 Sep. 3, 2009

(30) Foreign Application Priority Data
Jan. 22, 2008 (EP) .................................... 08425028

(51) Int. Cl.
*G01L 7/20* (2006.01)
(52) U.S. Cl. ........................................................ 73/384
(58) Field of Classification Search .................. None
See application file for complete search history.

(56) References Cited

U.S. PATENT DOCUMENTS

| 5,224,059 A * | 6/1993 | Nitta et al. .................. 73/384 |
| 6,713,828 B1 | 3/2004 | Chavan et al. |
| 6,768,449 B1 * | 7/2004 | Burgett et al. ........... 342/357.06 |
| 6,868,731 B1 | 3/2005 | Gatesman |
| 7,424,825 B2 * | 9/2008 | Saporito et al. .................. 73/384 |
| 7,429,948 B2 * | 9/2008 | Burgett et al. ................ 342/174 |
| 2007/0040732 A1 * | 2/2007 | Burgett et al. ................ 342/120 |
| 2007/0266783 A1 * | 11/2007 | Saporito et al. .................. 73/384 |
| 2009/0156205 A1 * | 6/2009 | Rowitch ........................ 455/434 |

FOREIGN PATENT DOCUMENTS

| EP | 0345929 A1 | 12/1989 |
| EP | 0996004 A2 | 4/2000 |
| EP | 1577656 A1 | 9/2005 |
| EP | 1775259 A1 | 4/2007 |

OTHER PUBLICATIONS

R. Russell et al., "Absolute Pressure Measurement using 3D-MEMS Technology," Nanotech 2005, pp. 511-514, vol. 2.
R. Colin Johnson, "MEMS devices go multidice, get smarter," EE Times.com, Apr. 16, 2007, 2 pages.

* cited by examiner

*Primary Examiner* — Andre J Allen
(74) *Attorney, Agent, or Firm* — Lisa K. Jorgenson; E. Russell Tarleton; Seed IP Law Group PLLC

(57) ABSTRACT

A barometric-pressure-sensor device for a portable electronic device, having a pressure sensor of a MEMS type designed to supply a barometric-pressure measurement, and with a processing circuit coupled to the pressure sensor that is designed to supply an altitude measurement as a function of the barometric-pressure measurement. The pressure sensor and the processing circuit are integrated in a single chip, and the processing circuit is a dedicated circuit of a purely hardware type. The processing circuit executes altimeter-setting operations through a plurality of reference registers containing respective pressure references.

18 Claims, 2 Drawing Sheets

BAROMETRIC-PRESSURE-SENSOR DEVICE WITH ALTIMETER FUNCTION AND ALTIMETER-SETTING FUNCTION

BACKGROUND

1. Technical Field

The present disclosure relates to a barometric-pressure-sensor device having an altimeter function and an altimeter-setting function and to such a device designed to be integrated in portable electronic devices.

2. Description of the Related Art

There is an increasing use of electronic devices in the field of sports training. For example, electronic barometric altimeters are used for applications of mountain climbing and the like, in which the continuous monitoring of the altitude is of paramount importance.

In particular, electronic barometric altimeters are known including a pressure sensor, and a microprocessor control and processing circuit, designed to acquire and process pressure signals supplied by the pressure sensor for determining altitude information.

Portable electronic devices are also known, such as, for example, mobile phones, satellite navigators or wrist watches, provided with a barometric-altimeter function. These devices include, for this purpose, a pressure sensor (for example, a pressure sensor of a microelectromechanical (MEMS) type, as illustrated in FIG. 1), supplying to a microprocessor of the portable electronic device barometric-pressure detection signals. The microprocessor, in addition to controlling the general operation of the corresponding portable electronic device, processes the barometric-pressure detection signals for determining the altitude information.

FIG. 1 shows, by way of example, a known piezoresistive pressure sensor of a MEMS type. The use of this sensor in the aforesaid portable electronic devices can prove advantageous, given its small size.

In detail, the pressure sensor 1 includes: a substrate 2 made of semiconductor material (typically silicon); a buried cavity 3, contained and insulated within the substrate 2; and a flexible membrane 4, suspended over the buried cavity 3 and bending in the presence of external mechanical stresses. Piezoresistive elements 5, connected in a Wheatstone-bridge configuration, are diffused in a surface portion of the flexible membrane 4 and contacted by metal regions 6 (which enable electrical connection of the pressure sensor 1 from the outside). The pressure sensor 1 may, for example, be manufactured as described in European patent application No. EP-A-1 577 656, filed in the name of the present applicant.

In use, the top side of the flexible membrane 4 (i.e., the side opposite to the buried cavity 3) is set in communication with the outside environment. Consequently, the flexible membrane 4 is deformed as a function of the difference between the atmospheric pressure and the pressure present within the buried cavity 3, and this deformation causes unbalancing of the Wheatstone bridge formed by the piezoresistive elements 5; the desired pressure measurement is obtained from the unbalancing of the Wheatstone bridge.

The previously described known devices have some disadvantages.

In particular, given that the corresponding microprocessor carries out the whole processing of the detection signals supplied by the pressure sensor 1 for altitude calculation, it is not possible to place the microprocessor in stand-by mode for reducing its power consumption, without forgoing the altimetric measurement function. In this regard, it is known that power consumption issues are particularly relevant in portable electronic devices.

In addition, microprocessors of portable electronic devices provided with the barometric-altimeter function are designed to perform for the most part of their operating period procedures for management of the general operation of the portable electronic devices. Consequently, processing of the detection signals supplied by the pressure sensor 1 has a low priority, causing a delay in the determination of the altitude information; this determination is in any case performed with an increase in the computational burden for the microprocessor, causing a degradation of the performance of the associated portable electronic device.

Moreover, microprocessors of portable electronic devices are often of a dedicated type, incorporated in ASICs (Application-Specific Integrated Circuits). Their operation is optimized for carrying out certain operations for which they have been designed, typically different from the ones linked to altimetric detection. This entails a considerable inefficiency in terms of time and computational load.

Finally, communication of the barometric-pressure detection signals from the pressure sensor 1 to the corresponding microprocessor can cause degradation of the signal quality, with a consequent increase in the electrical noise. In fact, these signals typically have a rather low amplitude, and often the portable electronic devices are subject to, or generate, electromagnetic fields that may degrade the signal quality.

BRIEF SUMMARY

In accordance with one embodiment of the present disclosure, a barometric-pressure-sensor device is provided that includes a pressure sensor for supplying a barometric pressure measurement; and a processing circuit coupled to the pressure sensor and configured to supply an altitude measurement as a function of the barometric pressure measurement; the pressure sensor and the processing circuit integrated in a single integrated circuit.

In accordance with another aspect of the foregoing embodiment, the processing circuit is a dedicated circuit of a purely hardware type. Ideally the pressure sensor is of a MEMS type.

In accordance with another aspect of the foregoing embodiment, the single integrated circuit includes at least a first die and a second die made of semiconductor material, the first die integrating the pressure sensor and the second die integrating the processing circuit.

In accordance with another aspect of the foregoing embodiment, the device further includes a temperature sensor for supplying an air temperature measurement; the processing circuit configured to supply the altitude measurement as a function of the barometric pressure measurement and the air temperature measurement, by means of an exponential function, and the temperature sensor integrated in the single integrated circuit.

In accordance with another aspect of the foregoing embodiment, the processing circuit includes a reference stage designed to enable altimeter setting functions; the reference stage including a plurality of reference registers storing respective pressure references, and an arithmetic unit configured to supply a differential-pressure measurement as a function of the barometric pressure measurement and of a reference selected between the pressure references.

In accordance with another aspect of the foregoing embodiment, the processing circuit further includes an alarm stage provided with a comparator circuit and a threshold register; the comparator circuit configured to make a comparison between the differential-pressure measurement and a threshold pressure stored in the threshold register, and to supply at output at least one alarm signal if the differential-pressure measurement has a given relation with the threshold pressure.

In accordance with another embodiment of the present disclosure, a circuit is provided that includes an integrated pressure sensor adapted to supply a barometric pressure measurement; an integrated air temperature sensor adapted to supply an air temperature measurement; and a processor integrated with the integrated pressure sensor and the integrated air temperature sensor in the same integrated circuit, the processing circuit adapted to supply an altitude measurement as a function of the barometric pressure measurement and the air temperature measurement by means of an exponential function, the processing circuit further including a reference stage having a plurality of reference registers that store, respectively, a first reference value corresponding to a pressure at sea level, a second reference value corresponding to an ISA standard setting, and a third reference value corresponding to a selective reference pressure, and an arithmetic unit configured to supply a differential-pressure measurement as a function of the barometric pressure measurement and of a reference value selected from one of the first, second, and third reference values.

In accordance with another aspect of the foregoing embodiment, the processing circuit further includes an alarm stage having a comparator circuit and a threshold register, the comparator circuit configured to compare the differential-pressure measurement and a threshold pressure stored in one of the three reference registers and to supply at output at least one alarm signal if the differential-pressure measurement has a given relation with the threshold pressure.

In accordance with another aspect of the foregoing embodiment, the processing circuit further includes arithmetic units adapted to perform processing operations based on the barometric pressure measurement and the air temperature measurement and to calculate the altitude measurement and for time derivation of the differential-pressure measurement and the altitude measurement.

In accordance with another embodiment of the present disclosure, a circuit is provided that includes a first logic circuit adapted to receive on a first input an air pressure sensor signal and on a second input an air temperature sensor signal and to output a barometric pressure signal; a second logic processing circuit comprising a reference stage having a plurality of reference registers, each reference register adapted to store a reference pressure setting; and a comparator stage adapted to output at least one alarm signal, and a plurality of outputs to output the barometric pressure signal, at least one reference signal corresponding to one of the reference pressure settings in one of the reference registers, and the at least one alarm signal.

In accordance with another aspect of the foregoing embodiment, the first logic processing circuit includes a first arithmetic logic unit adapted to receive the pressure measurement signal and the air temperature signal and to output the barometric pressure signal; and the second logic processing circuit includes a second arithmetic logic unit adapted to receive the barometric pressure signal and one of the reference pressure signals from the reference stage and to output a differential-pressure measurement signal to the comparator stage, and a third arithmetic logic unit adapted to receive the differential-pressure measurement signal and a clock signal and to output a derived quantity from the barometric pressure and the differential-pressure measurement signals on one of the plurality of outputs of the circuit.

In accordance with another aspect of the foregoing embodiment, the comparator stage includes first and second comparators adapted to output either a first alarm signal or a second alarm signal based on the result of comparisons of the first and second comparator stages.

BRIEF DESCRIPTION OF THE SEVERAL VIEWS OF THE DRAWINGS

For a better understanding of the disclosure, embodiments thereof are now described, purely by way of non-limiting example and with reference to the attached drawings, wherein.

DETAILED DESCRIPTION

As will be clarified hereinafter, one aspect of the present disclosure envisages provision of a pressure sensor of a MEMS type and a corresponding electronic processing circuit, of a purely hardware type, within just one integrated circuit, which performs autonomously, without the aid of external microprocessors, altimeter and altimeter-setting operations.

In a known way, the "altimeter setting" expression denotes, particularly in the field of aeronautic navigation, the set of operations aimed at setting the altimetric measurement with respect to a given reference. Given that barometric altimeters in general measure a difference of pressure and convert it into a height gain, this setting enables, via setting of the pressure value at the reference altitude, determination of the correct altitude with respect to the reference. Amongst the most widely known altimeter settings are the ones used by pilots and by air-traffic control (ATC), namely:

"QFE" setting: this is based on the atmospheric pressure (Q) measured by a station on the ground (normally "field elevation" at an airport) so that a barometric altimeter set on the QFE setting indicates the altitude with respect to a reference airport;

"QNH" setting: applying this setting, a barometric altimeter indicates pressure (Q) (within a certain degree of approximation) a zero altitude at sea level ("nautical height"), and consequently indicates, in use, the altitude with respect to the sea level; and "standard" setting: the barometric altimeter is set according to the so-called international standard atmosphere (ISA), an ideal atmosphere equal to 1013.25 kPa, the physical characteristics of which have been fixed by the International Civil Aviation Organization (ICAO), the isobar corresponding to this pressure value representing the zero level of flight.

Figure 1:
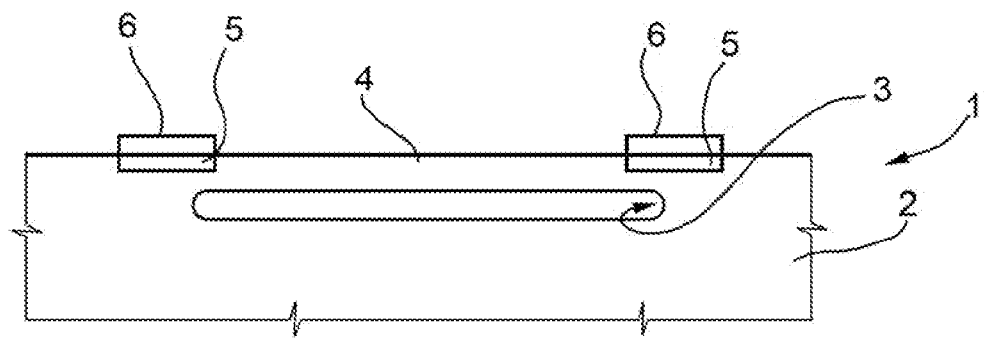
FIG. 1 shows a cross section of a known pressure sensor of a MEMS type.
Figure 2:
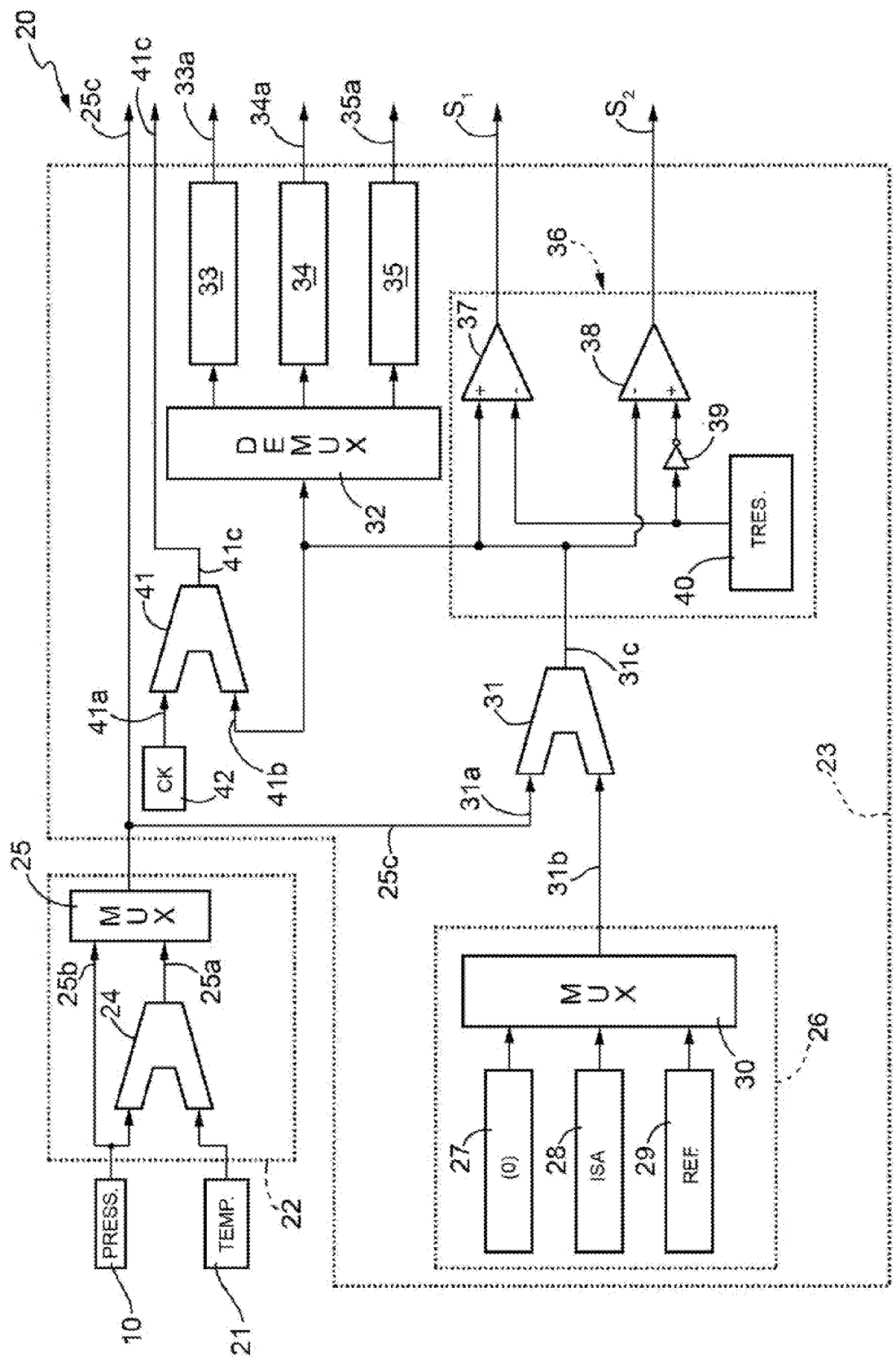
FIG. 2 shows an electrical block diagram of a barometric-pressure-sensor device, according to an embodiment of the present disclosure.

In detail, and as is illustrated in FIG. 2, the barometric-pressure-sensor device 20 includes a pressure sensor 10 of a MEMS type, in particular provided with a microelectromechanical detection structure of the type described with reference to FIG. 1, for measuring the atmospheric pressure; and a temperature sensor 21, for measuring the temperature of the air and of the same pressure sensor 10. The temperature sensor 21 is of an integrated type and made with semiconductor technologies. For example, the temperature sensor 21 includes a bipolar junction transistor (not illustrated) and is designed to detect the temperature of the air through the variation of a corresponding base-emitter voltage.

The barometric-pressure-sensor device 20 further includes a first logic processing circuit 22 (of a purely hardware type) designed to determine and make available an altitude information; and a second logic processing circuit 23 (of a purely hardware type), designed for carrying out, as will be described in detail hereinafter, functions of altimeter setting, of calculation of derived quantities, and of alarm signaling.

In greater detail, the first logic processing circuit 22 includes a first arithmetic-logic unit (ALU) 24 and a first multiplexer 25. The first arithmetic unit 24 has a first input and a second input connected, respectively, to the pressure sensor 10 and to the temperature sensor 21, and an output connected to a first input 25a of the first multiplexer 25. The first multiplexer 25 has a second input 25b directly connected to the output of the pressure sensor 10, and an output 25c defining a first output of the pressure-sensor device 20.

The first arithmetic unit 24 is designed to determine the altitude H at which the barometric-pressure-sensor device 20 is located as a function of the barometric pressure detected by the pressure sensor 10 and of the temperature detected by the temperature sensor 21. In particular, the altitude H can be, for example, calculated by means of the following equation:

$$p(H) = p(0) \cdot \exp\left(-\frac{H \cdot M \cdot g}{R \cdot T}\right)$$

where T is the air temperature, R is the perfect-gas constant, M is the molecular weight in grams of the air, g is the acceleration of gravity, and p(0) is the pressure at sea level.

The output 25c of the first multiplexer 25 hence carries information data both on the barometric pressure (directly detected by the pressure sensor 10) and on the altitude at which the barometric-pressure-sensor device 20 is located (detected by the first arithmetic unit 24), and supplies these data, alternatively, to the first output of the device (for example, for subsequent processing by a microprocessor of a portable electronic device incorporating the barometric-pressure-sensor device 20).

The second logic processing circuit 23 includes a reference stage 26, designed to supply pressure references by means of which the barometric-pressure-sensor device 20 is able to perform the altimeter setting functions.

In detail, the reference stage 26 includes three reference registers 27-29; and a second multiplexer 30 having three inputs, each connected to a respective one of the three reference registers 27-29, and an output, on which it supplies alternatively (and according to a received control signal—that is not illustrated) the contents of the three reference registers.

In greater detail, the three reference registers 27-29 contain, respectively:
- a first reference value corresponding to a pressure at sea level (QNH setting);
- a second reference value corresponding to the ISA model (standard setting); and
- a third reference value corresponding to a reference pressure which can be set by a user (QFE setting).

The second logic processing circuit 23 moreover includes a second arithmetic unit (ALU) 31 having a first input 31a connected to the output 25c of the first multiplexer 25, a second input 31b connected to the output of the second multiplexer 30 of the reference stage 26, and an output 31c, which supplies a differential-pressure measurement, given by the difference between the barometric pressure detected by the pressure sensor 10 and the selected reference value.

The second logic processing circuit 23 also has a demultiplexer 32 and three output registers 33-35.

The demultiplexer 32 has one input connected to the output 31c of the second arithmetic unit 31 and hence receiving the differential-pressure measurement, and three outputs, each connected to a respective one of the three output registers 33-35. In addition, the demultiplexer 32 is operatively coupled to the second multiplexer 30, and in particular receives the same control signal (not illustrated). The three output registers 33, 34, 35 consequently store, respectively, a value of absolute pressure with respect to sea level, a value of absolute pressure with respect to the international standard atmosphere, and a value of relative pressure with respect to a reference pressure set by the user. Basically, according to which one of the reference registers 27, 28, 29 is selected, the data processed by the second arithmetic unit 31 are written, respectively, in the output register 33, 34 or 35. In addition, the output registers 33, 34, 35 have respective outputs 33a, 34a, 35a that represent further outputs of the barometric-pressure-sensor device 20 and enable reading from outside of the data stored therein.

The second logic processing circuit 23 further includes a comparator stage 36, which is connected to the output 31c of the second arithmetic unit 31 and is designed to activate alarms $S_1$, $S_2$ indicating that the height/pressure has been exceeded.

In detail, the comparator stage 36 has a first comparator 37 and a second comparator 38 (each of which has an inverting input − and a non-inverting input +); an inverter 39 connected to the non-inverting input of the second comparator 38; and a threshold register 40 connected to the non-inverting input of the first comparator 37 and to an input of the inverter 39.

The outputs of the comparators 37 and 38 consequently depend on the difference between the differential-pressure measurement supplied by the output 31c of the second arithmetic unit 31 (in particular, to the non-inverting input of the first comparator 37 and to the inverting input of the second comparator 38) and the contents of the threshold register 40.

The configuration of the comparator stage 36 makes it possible to distinguish overstepping (positive or negative) of a range of height/pressure having an amplitude equal to the value contained in the threshold register 40. In detail, if $p_{th}$ is the pressure corresponding to the value contained in the threshold register 40 and $p_0$ the pressure corresponding to the output 31c of the second arithmetic unit 31, the alarms $S_1$, $S_2$ indicating that the height/pressure has been exceeded are activated in the following way:

$S_1$ is activated if and only if $p_0 > p_{th}$; and
$S_2$ is activated if and only if $p_0 < -p_{th}$.

The alarms $S_1$, $S_2$ are available at output from the barometric-pressure-sensor device 20 and can lead to activation of particular procedures, such as, for example, an interrupt control on the microprocessor of the portable electronic device in which the barometric-pressure-sensor device 20 is integrated.

The second logic processing circuit 23 includes a third arithmetic unit 41 having a first input 41a and a second input 41b, respectively connected to a clock generator 42 and to the output 31c of the second arithmetic unit 31, and an output 41c available on the outside of the barometric-pressure-sensor device 20. The third arithmetic unit 41 processes the signals at its inputs 41a, 41b and generates at its output 41c derived quantities of the pressure/altitude such as, for example, a climb or descent speed, or a meteorological tendency, both of which can be obtained through time-derivative operations on the detected or measured pressure/altitude.

Figure 3:
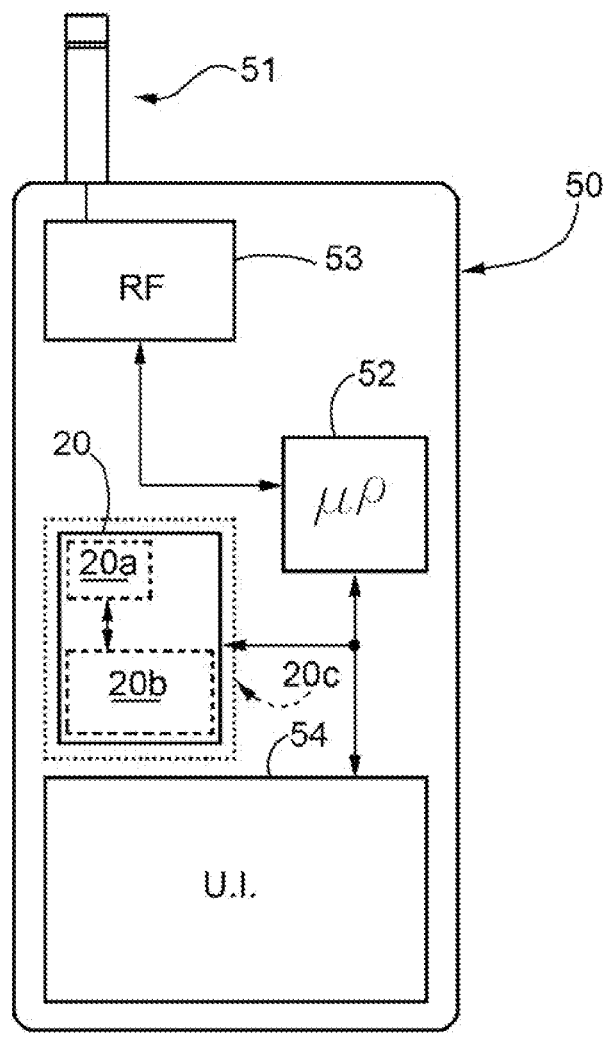
FIG. 3 shows an example of application of the barometric-pressure-sensor of FIG. 2 in a portable electronic device, in particular a mobile phone.

FIG. 3 illustrates a non-limiting example of a portable electronic device 50 provided with the barometric-pressure-sensor device 20.

As illustrated schematically in FIG. 3, the barometric-pressure-sensor device 20, made in a single integrated circuit (or chip) 20c and enclosed in a single package, includes two dies 20a and 20b made of semiconductor material. The first die 20a integrates the pressure sensor 1, whilst the second die 20b integrates the temperature sensor 21, the first and the second logic processing circuit 22, 23, and communication interfaces of a known type (for example, SPI/I2c).

The portable electronic device 50, in particular a mobile phone, is further provided with an antenna 51, a dedicated microprocessor 52, a radiofrequency circuit 53, and a user interface 54. The dedicated microprocessor 52 has the main task of supervising the transceiving functions specific to the portable electronic device 50 and is connected to the barometric-pressure-sensor device 20.

In this case, the dedicated microprocessor 52 only has to read the signals present on the outputs 25c, 41c, 33a, 34a, 35a (which carry the barometric pressure and altitude information) via interface circuits of a known type (for example, SPI/I2C), and the alarms $S_1$, $S_2$ indicating that the height/pressure has been exceeded sent by the barometric-pressure-sensor device 20, and possibly has the task of executing routines for management of the alarms, including, for example, outputting information to the user interface 54. Conveniently, the alarms $S_1$, $S_2$ are received on respective interrupt inputs of the dedicated microprocessor 52 so as to promptly activate the aforesaid alarm-management routine.

The advantages of the barometric-pressure-sensor device 20 are clear from the foregoing description.

In particular, the barometric-pressure-sensor device 20 enables reduction of the computational burden of the dedicated microprocessor 52 of the corresponding portable electronic device 50, in so far as all the operations of processing of the pressure and temperature signals, detected, respectively, by the pressure sensor 10 and by the temperature sensor 21, for determining the altitude and for execution of the altimeter settings, are performed by the first logic processing circuit 22 and by the second logic processing circuit 23. Consequently, only the task of reading the output signals, and possibly activating routines for management of the alarms $S_1$, $S_2$ indicating that the height/pressure has been exceeded, is entrusted to the dedicated microprocessor 52. The dedicated microprocessor 52 can query the barometric-pressure-sensor device 20 at pre-set time intervals, or else only when the user wishes to display his altitude. Alternatively, the barometric-pressure-sensor device 20 can be configured so as to re-activate the dedicated microprocessor 52 from a stand-by condition by means of the alarms $S_1$, $S_2$ indicating that the height/pressure has been exceeded. In this way, it is possible to reduce the power dissipation of the portable electronic device without, however, forgoing the altimeter function and altimeter-setting function.

In addition, the barometric-pressure-sensor device 20 enables a considerable degree of integration, given that both the pressure and temperature sensors 10 and 21, and the logic processing circuits 22, 23 are provided in just one integrated circuit 20c. The absence of long connections between the various components enables electrical signals with limited noise to be obtained.

In addition, integration of the altimeter and altimeter-setting functions within the integrated circuit 20c enables reduction of the modifications to be made to the dedicated microprocessor 52 of the portable electronic device 50 as compared to the case of a reprogramming of the firmware of the same dedicated microprocessor.

Finally, it is evident that modifications and variations may be made to the barometric-pressure-sensor device 20 described herein, without thereby departing from the scope of the present disclosure, as defined by the annexed claims.

The components of the logic processing circuits 22, 23 may be of a different type. In particular, the first, second, and third arithmetic units 24, 31, 41 can be integrated in just one ASIC processor having higher computing power.

In addition, expressions of a different type, representing an approximation of the real situation, may be used for calculating the altitude H as a function of the atmospheric pressure and temperature.

A semiconductor memory, for example of a phase-change type, may be included within the integrated circuit 20c in which the barometric-pressure-sensor device 20 is provided; this memory may store all the data contained in the registers and be able to carry out both read and write operations, as well as management of a table of alarm activation and of barometric pressure variation in time.

Finally, the barometric-pressure-sensor device 20 can be conveniently used in further portable electronic devices, such as, for example, a free-flight portable system, supplying to a user all the fundamental parameters of flight; a satellite navigator; a wrist watch; a transceiver; a step counter. The barometric-pressure-sensor device 20 may also be provided in fixed detection stations.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor device, in particular for a portable electronic device, comprising:
    a pressure sensor for supplying a barometric pressure measurement;
    a processing circuit coupled to the pressure sensor; and
    a temperature sensor to supply an air temperature measurement; the processing circuit configured to supply the altitude measurement as a function of the barometric pressure measurement and the air temperature measurement by means of an exponential function.

2. The device according to claim 1 wherein said processing circuit is a dedicated circuit of a purely hardware type.

3. The device according to claim 1 wherein said pressure sensor is of a MEMS type.

4. The device according to claim 1 wherein the temperature sensor, pressure sensor, and processor are integrated in a single integrated circuit that includes at least a first die and a second die made of semiconductor material, the first die integrating the pressure sensor and the second die integrating the processing circuit and temperature sensor.

5. The device according to claim 1 wherein the pressure sensor, processing circuit, and temperature sensor are integrated in a single integrated circuit.

6. A sensor device, in particular for a portable electronic device, comprising:
a pressure sensor for supplying a barometric pressure measurement; and
a processing circuit coupled to the pressure sensor and configured to supply an altitude measurement as a function of the barometric pressure measurement; the pressure sensor and the processing circuit integrated in a single integrated circuit, the processing circuit further including a reference stage designed to enable altimeter setting functions; the reference stage including a plurality of reference registers storing respective pressure references, and an arithmetic unit configured to supply a differential-pressure measurement as a function of the barometric pressure measurement and of a reference selected between the pressure references.

7. The device according to claim 6 wherein said processing circuit further comprises an alarm stage provided with a comparator circuit and a threshold register; said comparator circuit configured to make a comparison between said differential-pressure measurement and a threshold pressure stored in said threshold register, and to supply at output at least one alarm signal if said differential-pressure measurement has a given relation with said threshold pressure.

8. The device according to claim 6, further comprising a temperature sensor, for supplying an air temperature measurement; wherein said processing circuit comprises further arithmetic units configured to perform processing operations based on said barometric pressure measurement and air temperature measurement, in particular for the calculation of said altitude measurement, and for time derivation of said differential-pressure measurement and said altitude measurement.

9. The device according to claim 6 wherein said processing circuit further comprises an output stage provided with a plurality of output registers, which are operatively coupled to said reference registers and each one of which supplies a respective differential-pressure measurement referred to a respective one of said pressure references.

10. The device according to claim 3 wherein said pressure sensor comprises: a substrate made of semiconductor material having a buried cavity; a flexible membrane suspended over said buried cavity; and piezoresistive elements diffused in a surface portion of said flexible membrane.

11. A portable electronic device, comprising:
a barometric-pressure-sensor device; and
one of from among a wrist watch, a mobile phone, a transceiver, a satellite navigator, and a step-counting device, the sensor comprising:
a pressure sensor for supplying a barometric pressure measurement; and
a processing circuit coupled to the pressure sensor and configured to supply an altitude measurement as a function of said barometric pressure measurement; said pressure sensor and the processing circuit integrated in a single integrated circuit, the processing circuit having a reference stage, designed to enable altimeter setting functions; the reference stage including a plurality of reference registers storing respective pressure references, and an arithmetic unit configured to supply a differential-pressure measurement as a function of the barometric pressure measurement and of a reference selected between the pressure references, and wherein the processing circuit further includes an alarm stage provided with a comparator circuit and a threshold register; the comparator circuit configured to make a comparison between the differential-pressure measurement and a threshold pressure stored in the threshold register, and to supply at output at least one alarm signal if the differential-pressure measurement has a given relation with the threshold pressure.

12. The portable electronic device according to claim 11, further comprising a dedicated microprocessor, designed to manage the general operation of said portable electronic device, and having at least one interrupt input connected to said barometric-pressure-sensor device and designed to receive said at least one alarm signal.

13. A circuit, comprising:
an integrated pressure sensor adapted to supply a barometric pressure measurement;
an integrated air temperature sensor adapted to supply an air temperature measurement; and
a processor integrated with the integrated pressure sensor and the integrated air temperature sensor in the same integrated circuit, the processing circuit adapted to supply an altitude measurement as a function of the barometric pressure measurement and the air temperature measurement by means of an exponential function, the processing circuit further comprising a reference stage having a plurality of reference registers that store, respectively, a first reference value corresponding to a pressure at sea level, a second reference value corresponding to an ISA standard setting, and a third reference value corresponding to a selective reference pressure, and an arithmetic unit configured to supply a differential-pressure measurement as a function of the barometric pressure measurement and of a reference value selected from one of the first, second, and third reference values.

14. The circuit of claim 13 wherein the processing circuit further comprises an alarm stage having a comparator circuit and a threshold register, the comparator circuit configured to compare the differential-pressure measurement and a threshold pressure stored in one of the three reference registers and to supply at output at least one alarm signal if the differential-pressure measurement has a given relation with the threshold pressure.

15. The circuit of claim 14 wherein said processing circuit further comprises arithmetic units adapted to perform processing operations based on the barometric pressure measurement and the air temperature measurement and to calculate the altitude measurement and for time derivation of the differential-pressure measurement and the altitude measurement.

16. A circuit, comprising:
a first logic circuit adapted to receive on a first input an air pressure sensor signal and on a second input an air temperature sensor signal and to output a barometric pressure signal;
a second logic processing circuit comprising a reference stage having a plurality of reference registers, each reference register adapted to store a reference pressure setting; and
a comparator stage adapted to output at least one alarm signal, and a plurality of outputs to output the barometric pressure signal, at least one reference signal corresponding to one of the reference pressure settings in one of the reference registers, and the at least one alarm signal.

17. The circuit of claim 16 wherein the first logic processing circuit comprises a first arithmetic logic unit adapted to receive the pressure measurement signal and the air temperature signal and to output the barometric pressure signal; and
the second logic processing circuit comprises a second arithmetic logic unit adapted to receive the barometric pressure signal and one of the reference pressure signals from the reference stage and to output a differential-pressure measurement signal to the comparator stage, and a third arithmetic logic unit adapted to receive the differential-pressure measurement signal and a clock signal and to output a derived quantity from the barometric pressure and the differential-pressure measurement signals on one of the plurality of outputs of the circuit.

18. The circuit of claim 17 wherein the comparator stage comprises first and second comparators adapted to output either a first alarm signal or a second alarm signal based on the result of comparisons of the first and second comparator stages.

\* \* \* \* \*